BEST AVAILABLE COPY

J. C. LOTTERHAND.

PRINTING MECHANISM FOR ADDING MACHINES.

APPLICATION FILED APR. 16, 1915.

Reissued Aug. 22, 1916.

14,185.

4 SHEETS—SHEET 1.

Inventor
Jason C. Lotterhand.
William H. Reid.
Attorney

BEST AVAILABLE COPY
J. C. LOTTERHAND.
PRINTING MECHANISM FOR ADDING MACHINES.
APPLICATION FILED APR. 16, 1915.
Reissued Aug. 22, 1916.
14,185.
4 SHEETS—SHEET 2.
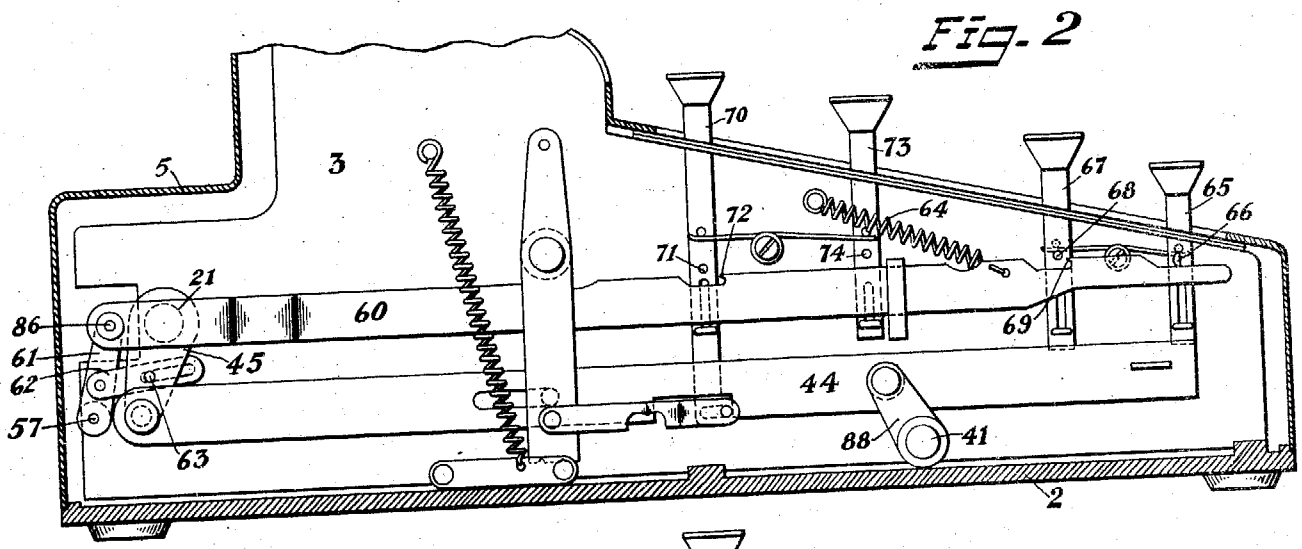
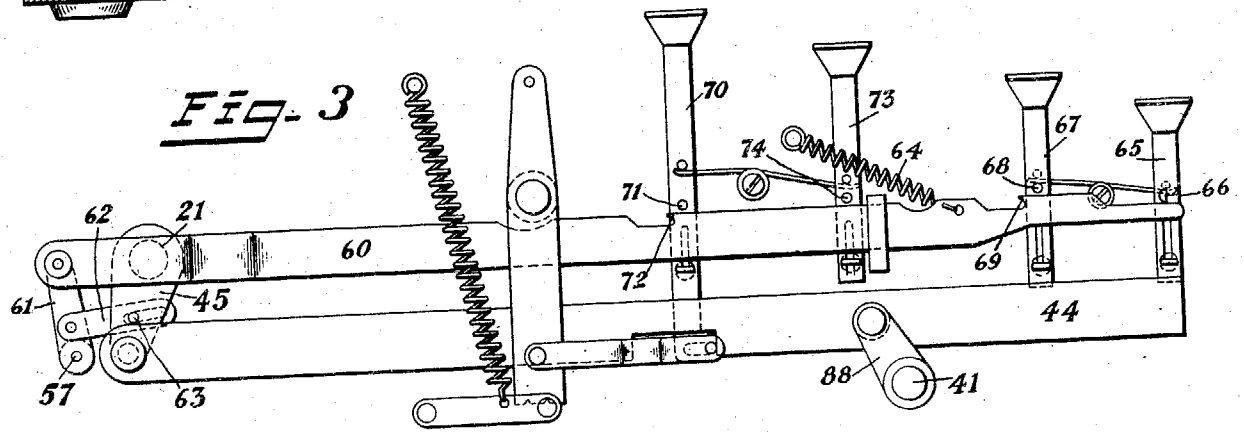
Inventor
Jason C. Lotterhand.
William H. Reid.
Attorney

BEST AVAILABLE COPY

J. C. LOTTERHAND.

PRINTING MECHANISM FOR ADDING MACHINES.

APPLICATION FILED APR. 16, 1915.

Reissued Aug. 22, 1916.

14,185.

4 SHEETS—SHEET 3.

Inventor
Jason C. Lotterhand.
William H. Reid.
Attorney

BEST AVAILABLE COPY

J. C. LOTTERHAND.

PRINTING MECHANISM FOR ADDING MACHINES.

APPLICATION FILED APR. 16, 1915.

Reissued Aug. 22, 1916.

14,185.

4 SHEETS—SHEET 4.

Inventor
Jason C. Lotterhand.
William H. Reid
Attorney

BEST AVAILABLE COPY

UNITED STATES PATENT OFFICE.

JASON C. LOTTERHAND, OF NEW YORK, N. Y., ASSIGNOR TO ADDOMETER CORPORATION, A CORPORATION OF DELAWARE.

PRINTING MECHANISM FOR ADDING-MACHINES.

14,185. Specification of Reissued Letters Patent. Reissued Aug. 22, 1916.

Original No. 1,092,497, dated April 7, 1914, Serial No. 745,893. Application for reissue filed April 16, 1915. Serial No. 21,890.

*To all whom it may concern:*

Be it known that I, JASON C. LOTTERHAND, a citizen of the United States, and resident of New York, in the county and State of New York, have invented certain new and useful Improvements in Printing Mechanism for Adding-Machines, of which the following is a specification.

One of the objects of the present invention is to provide an improved form of means for printing the signals in an adding machine, that is effected by the operation of simply depressing one of the signal keys, and the printing is accomplished at once before any movement whatever is given to the main operating handle or member of the machine.

A further object of the invention is to provide in such a device, in connection with the total and sub-total keys, means whereby the mere depression of either of these keys will cause the signal to be printed at once, and before any movement of the operating member.

A further object of the invention is to provide in an adding machine having the usual set of members known as rack and type plates, that serve to position the type plates for printing, improved means for accurately positioning or locking the type plates after they have been positioned to print, to effect the proper alinement of the type at the printing position.

Another object of the invention is to provide in an adding machine that operates both an adding and listing device, an improved means for permitting the operation of the adding mechanism, while the printing mechanism is prevented from printing.

Figure 1:
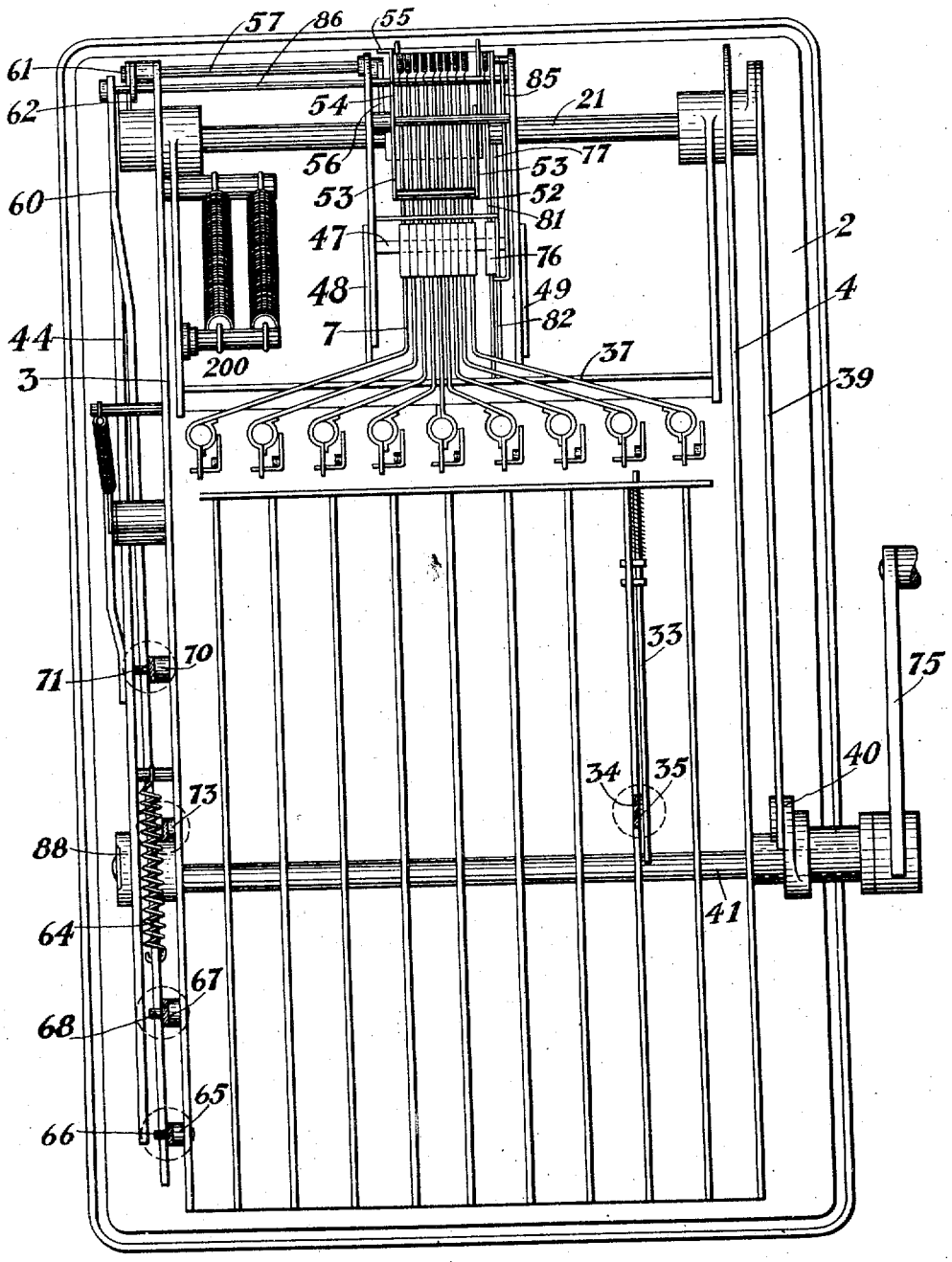
Figure 4:
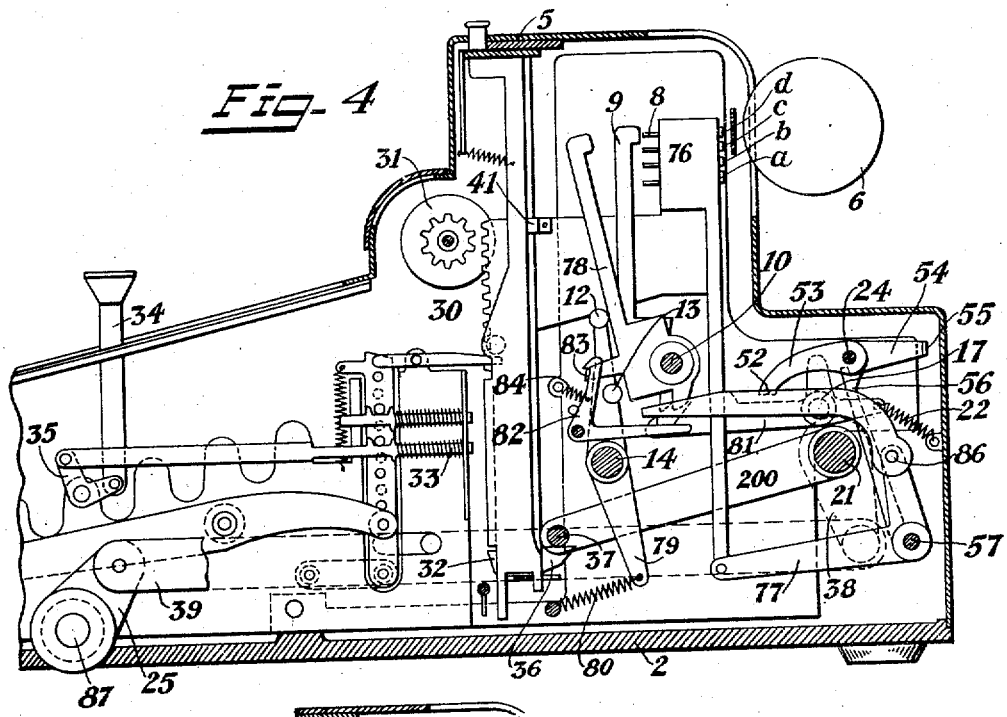
Figure 5:
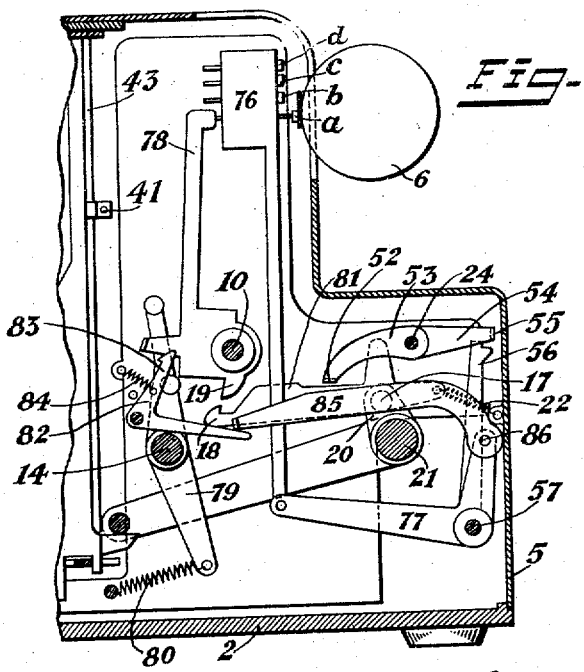
Figure 6:
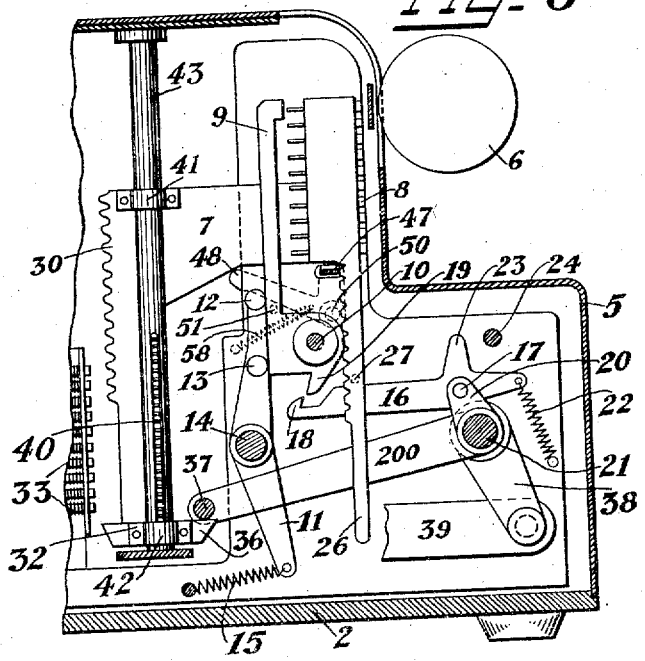
Figure 7:
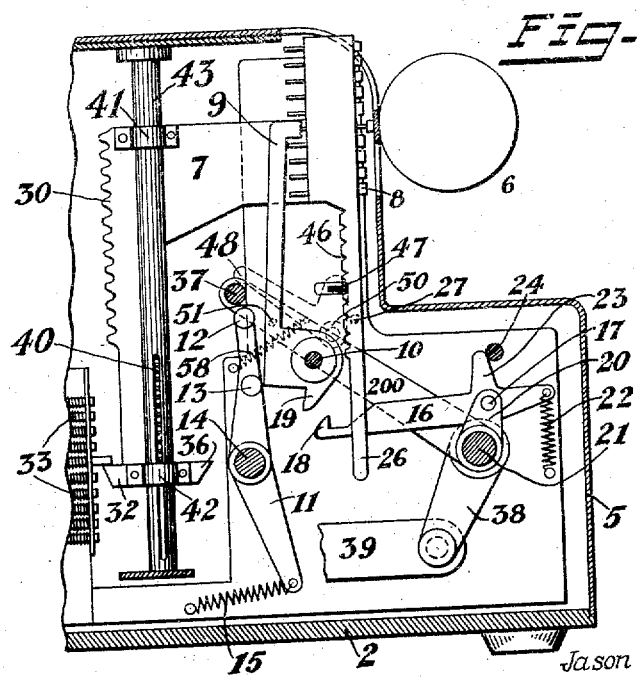

In the accompanying drawings, representing one embodiment of my invention, Figure 1 is a plan view of a portion of an adding machine with my invention applied thereto; Fig. 2 is a side elevation showing the signal keys and connected parts; Fig. 3 is a view of parts shown in Fig. 2, in other positions; Fig. 4 is an elevation showing the printing devices; Fig. 5 is a fragmentary view showing the printing devices in other positions, and Figs. 6 and 7 show the means for locking the rack and type plates in printing positions.

It is customary in adding machines to provide in addition to the adding mechanism, means for printing on a suitable record, the items as set up in the machine, also the total, and sometimes the sub-total. It is further customary to have a special character or signal printed on the record adjacent the total, or the sub-total, or other number that may be printed, to indicate its special character. One form of character will be printed opposite the total, another form opposite a sub-total, and sometimes other characters for numbers that are printed but not included in the sum and which do not affect the adding mechanism. Also sometimes an item is included in a sum but it is not desired to print this item, when a certain character can be printed adjacent the blank space on the record.

In the form of machines at present in use, the printing of special characters, while it is usually automatic in its operation, is effected simultaneously with the printing of the several members to which they relate. Obviously, where a non-print sign is used there is no printing effected. It has been found desirable to do this printing entirely separate and distinct from the numeral printing mechanism of the machine, and in the present invention such an operation takes place. Furthermore, the printing of these special signs is done at the time the special keys for such characters are depressed, and not subsequently upon the movement of the handle or main operating member of the machine. To be specific, when either the total or sub-total keys is depressed, or the non-add key, or the nonprint key, immediately the corresponding character is caused to print on the record, which operation is completed before any movement whatever of the main operating handle or member of the mechanism.

The machine is shown as comprising a suitable base 2 with upright side plates 3 and 4 on each side, and also a suitable casing 5. At the rear is shown a platen 6 and in front of the same are arranged a series of rack and type plates 7, carrying a set of type plungers 8, see Figs. 4–7. The rack and type plates are each shiftable to bring any one of its type in position to print on the platen, and in front of each rack and type plate is arranged a hammer 9 that will

BEST AVAILABLE COPY strike the positioned type of its corresponding rack and type plate to effect the impression on the platen. By this means a row of figures will be printed in a horizontal line on a record sheet on the platen, and it is desirable to print the special character or signal adjacent this number preferably at one side, such as the right hand side, as is done in the construction set forth herein.

The hammers 9 are shown as all mounted to swing on a cross shaft 10, see Figs. 4 and 5, suitably supported at each end, and each hammer is provided with an energizer lever 11 having contacts 12 and 13 for engagement with the rear edge of the corresponding hammer, these levers swinging on a stationary shaft 14, and being retracted by a spring 15 at the lower end of the lever to swing the lever and cause the hammer to strike, when the hammer has been retracted.

Coöperating with each hammer is a trigger 16 mounted on a suitable shaft 17 to swing thereon to cause a hook 18 on each trigger to engage a tip 19 connected with each hammer 9. The shaft 17 for the triggers, is mounted on a pair of swinging levers 20 fast on an operating shaft 21, by which the levers are swung to shift the position of the shaft 17 and thereby bodily move the triggers back and forth. A spring 22 connects each trigger with a suitable fixed place, to swing the triggers and bring the hook to engage the tip 19. But when the levers 20 move the shaft 17 rearward carrying the triggers back, an arm 23 on each trigger engages a stop bar 24 that will swing the triggers against the force of their springs and trip the hook from the tip. When the triggers moved the hammers away from the type, they swung forward and placed their energizer levers under tension, and when the triggers are thus tripped, the hammers will be released to strike the type.

Each rack and type plate 7 is provided with an extension 26 carrying a stop 27 normally engaging the top edge of the trigger 16 to hold the trigger down with its hook below the tip of the coöperating hammer so that when the rack and type plate is in this position, the rearward movement of the trigger by the swinging of the lever will not affect the hammer. But as soon as the rack and type plate rises the hammer will rise and cause the hook to engage the tip. The rack and type plate is provided with a rack 30 on its front portion to engage numeral wheels 31. At the foot of the rack and type plate is a stop 32 arranged to engage stop bars 33, as indicated in Fig. 7, the stop bars being each connected with key stems 34 by means of a bent lever 35. At the rear of the rack and type plate at its foot is another lug 36 arranged to engage a universal bar 37 mounted on the side arms.

When the shaft 21 is swung by means of an arm 38 connected with a side bar 39, the universal bar will permit the rack and type plates to be elevated by springs 40. Each rack and type plate has suitable guides 41 and 42 sliding on posts 43, in each of which is placed the spring 40, that will elevate the rack and type plate when free to move upward. When the universal bar travels upward each rack and type plate will be thus drawn upward until its foot 32 engages a stop bar that has been set by a key, when the rack and type plate is arrested with a type in the printing position opposite the hammer that corresponds with the key depressed. The side bar 39 is shown connected with a crank 25 fast on a crank shaft 87 operated by a handle 75. This shaft 87 extends across the machine and carries on the opposite side a crank 88, see Fig. 2, that operates a side bar 44 similar to the side bar 39. A crank 45 connects shaft 21 with the side bar 44.

In order to accurately position or lock the type carrier portion of the rack and type plate when it rises to engage a suitable stop bar, as indicated in Fig. 7, the extension 26 is provided with a set of recesses 46, as indicated in Fig. 6, and a lock bar 47 is provided that will be advanced to engage one of these recesses just before the printing operation takes place. These recesses are spaced apart corresponding to the exact relative position of the type so that when this bar enters a recess the positioned type will be precisionized and locked. The bar 47 is mounted at its ends on levers 48 and 49, that are suitably pivoted at 50. These levers engage the universal bar 37 at the final portion of its upward movement, whereby the swinging of these levers will move the bar 47 into one of the recesses 46 just at the stage when the printing operation will take place. A spring 58 serves to return the arms and bar as soon as the universal bar begins its return movement, and they engage a suitable stop pin 51 to hold the bar out of the path of the rack bar extension.

Means are also provided for preventing operation of the printing hammers, when the rack and type plates are elevated to actuate the adding mechanism, which is known as the non-print operation. In Fig. 4 is shown a bar 52 carried by a pair of suitably pivoted levers 53, that lies on top of the triggers 16. This bar is normally free so that the triggers will not be interfered with in their upward movement. But an arm 54 connected with one of these triggers, extends to the rear and is provided with an ear 55 arranged to be engaged by a stop arm 56 mounted on a rock shaft 57 suitably supported at the rear of the machine and extending beyond the left side plate 3. This shaft is rocked by means hereinafter set forth. In the position shown in Fig. 5 the stop 56 will hold bar 52 engaging the trig-

BEST AVAILABLE COPY gers and prevent their rising when the rack and type plates move upward, and therefore the triggers will not swing and trip any of the hammers. As shown in Fig. 2, on the left side of the machine, is arranged a bar 60 pivoted at its rear to a crank 61 fast on the said shaft 57. A slotted link 62 connects the crank 61 with the crank 45 by a pin 63 thereon. This bar 60 is pulled rearwardly by a coil spring 64 that will serve to rock the shaft 57. The link 62 serves to swing the crank 61 to return the bar 60 on the forward movement of the side bar 44 by the operating handle in the normal operation of the machine. A total key 65 is shown that is vertically slidable and carries a lug 66 arranged to engage the bar 60 when the key is depressed. The bar has an inclined lug or cam 59 arranged to engage the lug 66 to hold the bar 60 in normal forward position with the spring 64 under tension. A sub-total key 67 is provided having a pin 68 arranged to engage the bar 60 and depress it, whereby the bar will have the lug 59 disengage the pin 66, and thus permit the spring 64 to draw the bar rearward; the latter movement being limited by a stop 69 on the bar. A third key 70 which may be the non-add key, is vertically slidable to have its stop 71 engage the bar 60 to swing it and release it from the stop 66; and the rearward movement is limited by a suitable stop 72. Thus the stops of the keys 67 and 70 are relatively positioned whereby the latter will permit a greater rearward movement of the bar 60; it being understood that the depression of the key 65 will not permit any rearward movement of the bar. A fourth key 73 is shown that may be the non-print key, having a stop 74 arranged to strike the bar and swing it down to disengage the stop 66. But no limit abutment is provided for the stop 74, whereby the bar 60 can be moved rearward its full distance. It will be understood that these four keys will each swing the bar downward, and that three of them will permit rearward movement of the bar for different distances, respectively, while the fourth key will not permit any rearward movement. When the bar 60 has been shifted rearwardly, the next operation of the operating member, side bar 44 and crank 45 will cause the link 62 to swing the bar 60 forward again, causing the cam stop 59 to reëngage the stop 66 to lock the bar in its normal forward position. It will be understood that the operation of any one of these three keys will shift the bar 60 rearward to rock the shaft 57 a different distance. When the non-print key is depressed the shaft will be rocked its maximum distance, and this will be effective to move the stop arm 56 rearward a maximum distance to lock the arm 54 to hold all the triggers 16 out of position for engagement with the hammers.

At the right side of the described rack and type plates is a printing plate or carrier 76 carrying four type, *a*, *b*, *c*, and *d*, see Fig. 4, that can be brought opposite a printing position on the platen. This carrier 76 is pivoted to an arm 77 fast on the shaft 57, and these parts are so arranged that in the four positions of this shaft 57 produced by the depression of one of the said four keys, one of these type is brought to the printing position. When the total key is depressed, the bar 60 is not shifted, and the shaft remains stationary, the type *d* will be opposite the printing position, which is the total character printing type. A hammer 78 is suitably pivoted to strike these type as positioned, and is provided with an energizer 79 controlled by a spring 80 similar to those described. A special trigger 81 is provided to cock the hammer 78, being constructed similar to the triggers described, and mounted on the same shaft 17, whereby the hammer is cocked when other hammers are swung back. When the hammer 78 has been cocked, it is held by a latch 82 that engages an ear 83 on the rear of the hammer to hold it in its cocked position, the latch being swung forward by a spring 84. In the normal operation of the machine by which the hammers are cocked and then released, this hammer 78 will be cocked to engage the latch 82, that will hold it in the cocked position and it will not be tripped at this time. To trip this latch, an arm 85 is provided fast on a cross shaft 86 that is secured to the bar 60 at its pivotal connection with the crank 61.

When one of these four keys is depressed, for instance the total key, the bar 60 cannot move rearward, and at the final part of the downward swing of the bar 60, the shaft 86 will swing sufficiently to cause the arm 85 to trip the latch and permit the cocked hammer 78 to strike the type in the carrier 76; the type for the total being normally positioned. But when any of the other keys is depressed, as the key 70, its pin 71 will strike the bar 60 and swing it downward, but the initial movement will not be sufficient to trip the cocked hammer. The bar moving downward will be soon disengaged from the pin 66 and the bar will be instantly drawn rearward by the tensioned spring 64. This rearward movement of the bar 60 will rock the shaft 57 and shift the carrier 76 to bring the non-add character to printing position. It will be understood that this rearward movement of the bar is effected instantaneously before the key 70 has been depressed its full distance, and at the final downward movement of the key the bar will be swung sufficiently to rock the shaft 86 and swing the arm 85, tripping the latch to release the cocked hammer, and the non-add character will print. The same applies to the other two keys 67 and 73, in which case the carrier will be first shifted to bring the proper character to printing position, and thereupon the cocked hammer will be tripped. It will be understood that this operation of printing the character is performed at once upon the depression of any of these keys, and is absolutely independent of the movement of the operating handle and connected parts of the machine. But the operating handle serves to restore the side bar 60 to the former position, and further to re-cock the hammer 78 to be ready for the next operation of any of these four keys.

Having thus described my invention, what I claim is:—

1. In a calculating machine, the combination of a signal key, means for printing a signal, a main operating member, means for causing the signal printing means to be cocked by the movement of the operating member and to remain cocked at the conclusion of its normal movement, and means for causing the operation of the said key to effect the actuation of the printing means.

2. In a calculating machine, a signal printing member arranged to print a plurality of signals, a plurality of signal keys, one for each signal, means connecting the printing member and the key arranged to cause the depression of any of said keys to first shift the printing member and to thereupon effect the printing of the signal corresponding to the signal key depressed, a main operating member, and means for causing the operation of said main operating member to cause the signal printing means to be set to remain cocked at the conclusion of the movement of such operating member.

3. In a calculating machine, a signal member carrying a set of signal type, a hammer movable in a certain path, a set of signal keys, means connecting the keys and the carrier causing the depression of any of the keys to shift the carrier with the type corresponding to the key depressed brought to be engaged by the hammer when swung to thereby print, and which carrier is so shifted at the initial movement of the key, a main operating member for the machine, and means connecting the hammer with the operating member arranged to cause the hammer to be cocked by the normal operation of the member and to remain cocked at the end of the movement of such member.

4. In a calculating machine, a signal printing member arranged to print a plurality of signals, a hammer movable in a certain fixed path to strike the different signals in different positions of the said member to cause them to print, a bar connected with the carrying member and also with the hammer, a set of keys each arranged to connect with said bar and arranged when depressed to each cause the carrying member to be set at a different position, and to thereupon cause the hammer to be operated to print the signal corresponding to the key depressed, a main operating member for the machine, and means connecting the hammer with the operating member arranged to cause the hammer to be cocked by the normal operation of the member and to remain cocked at the end of the movement of such member.

5. In a calculating machine, a rack and type plate provided with a carrier portion, type in the carrier portion, the plate having a set of recesses corresponding in relative position to the type on the plate, a lock bar movably supported on the machine to engage the different recesses as the said plate is shifted to different printing positions, a universal bar arranged to control the movement of all the rack and type plates, means for normally holding said lock bar away from the rack and type plate, and means connected with the lock bar arranged to be engaged by the universal bar when the latter has disengaged the rack and type plates, to shift the lock bar to engage the rack and type plates at said notches.

6. In a calculating machine, a movable signal carrying member, a set of signal printing type thereon, a hammer movable in a certain path to strike the type respectively in the different positions of the carrying member, a bar supported to move endwise and also to have a lateral movement, said bar being connected with the carrier to shift the carrier when moved endwise, means connecting said bar with the hammer whereby the hammer when cocked will be tripped by the swinging of said bar, and a set of keys operatively connected with said bar to swing the bar and to control endwise movement of the bar to swing the carrier to different positions according to the key depressed.

7. In a calculating machine, a movable signal carrying member, a set of signal printing type thereon, a hammer movable in a certain path to strike the type respectively in the different positions of the carrying member, a bar supported to move endwise and also to have a lateral movement, said bar being connected with the carrier to shift the carrier when moved endwise, means connecting said bar with the hammer whereby the hammer when cocked will be tripped by the swinging of said bar, a set of keys operatively connected with said bar to swing the bar and to control endwise movement of the bar to swing the carrier to different positions according to the key depressed, an operating member on the machine, and connections between the oper-

BEST AVAILABLE COPY ating member and the hammer arranged to cock the hammer in the normal operation of the machine.

8. In a calculating machine, a movable signal carrying member, a set of signal printing type thereon, a hammer movable in a certain path to strike the type respectively in the different positions of the carrying member, a bar supported to move endwise and also to have a lateral movement, said bar being connected with the carrier to shift the carrier when moved endwise, means connecting said bar with the hammer whereby the hammer when cocked will be tripped by the swinging of said bar, a set of keys operatively connected with said bar to swing the bar and to control endwise movement of the bar to swing the carrier to different positions according to the key depressed, an operating member in the machine, connections between the operating member and the hammer arranged to cock the hammer in the normal operation of the machine, and means connected with the operating member for returning said bar to normal position.

9. In a calculating machine, a movable signal printing member, a series of signal type on the member, a plurality of signal keys one for each signal, a bar mounted adjacent said keys and arranged to swing, means connecting said bar and the carrier whereby the endwise movement of the carrier will shift the type carrying member, a spring connected with the bar for moving it in this direction, an operating member on the machine, means connecting the operating member with said bar to move the bar against the force of said spring, a stop on each of the keys, an abutment on the bar arranged to engage the stop on one said key to retain the bar in normal position against the force of said spring, the bar having other abutments arranged to engage the stops on the other keys when depressed to thereby release the bar from said stop and key and permit a limited endwise movement of the bar by its spring, whereby to position the printing member, and means connecting the bar with said hammer to release the hammer when cocked by the swinging of the bar from depression of the keys.

10. In a calculating machine, a movable signal printing member, a series of signal type on the member, a plurality of signal keys one for each signal, a bar mounted adjacent said keys and arranged to swing, means connecting said bar and the carrier whereby the endwise movement of the carrier will shift the type carrying member, a spring connected with the bar for moving it in this direction, an operating member on the machine, means connecting the operating member with said bar to move the bar against the force of said spring, a stop on each of the keys, an abutment on the bar arranged to engage the stop on one said key to retain bar in normal position against the force of said spring, the bar having other abutments arranged to engage the stops on the other keys when depressed to thereby release the bar from said stop and key, and permit a limited endwise movement of the bar by its spring whereby to position the printing member, means connecting the bar with said hammer to release the hammer when cocked by the swinging of the bar from depression of the keys, and means connecting the hammer with said operating member to cause the hammer to be cocked in the normal operation of the operating member.

11. In a calculating machine, the combination of a set of type carriers, a set of hammers arranged to engage the type carriers to print, a set of actuators for the hammers, a set of triggers one for each hammer to cock the hammers, and a bar arranged to retain the triggers out of position of engagement with the hammers.

12. In a calculating machine, the combination of a set of rack and type plates, type carried by the plates, a set of hammers arranged to engage the type on the plates, a set of actuating levers for the hammers, a set of triggers for the hammers arranged to trip the hammers when the triggers are moved back and forth, the rack and type plates having means engaging the triggers in the normal position of the plates to prevent engagement between the triggers and the hammers, and a bar arranged to be shifted to engage the triggers to hold them all away from position of engagement with the hammers.

13. In a calculating machine, a movable signal carrying member, a set of signal type on the member, a hammer movable in a certain path to engage the different type upon shifting of said member, an energizer lever to advance the hammer when cocked, a trigger arranged to engage the hammer to cock the hammer against the force of its energizer lever, an operating member for the machine connected with the trigger to shift the trigger in the normal operation of the member and cock the hammer, a latch arranged to engage the hammer when cocked to hold the hammer in such position, a set of signal keys connected with said signal carrying member to shift the member upon initial movement of the keys to bring different type to a printing position according to the key depressed, and means connecting said latch with the keys to trip the latch at the latter portion of the movement of the key to release the hammer to strike the set type.

14. In a calculator, the combination with

BEST AVAILABLE COPY accumulating and printing means, a main operating device for said means arranged to set up selected items upon the normal operation of such device, and special keys adapted to cause special operations of the accumulating or printing means, or of both, on operation of the main operating device, of signal printing means connected with the special keys and organized and constructed to be operated to print a signal at once upon the depression of the special key and previous to the operation of the said main operating device that effects the special operation of the machine according to the special key depressed.

15. In a calculator, the combination with accumulating and printing means, a main operating device for said means arranged to set up selected items upon the normal operation of such device, and special keys adapted to cause special operations of the accumulating or printing means, or of both, on operation of the main operating device, of signal printing means connected with the special keys and organized and constructed to be energized by and during the operation of said main operating device without at such time effecting the signal printing, said signal printing means being connected with the special printing keys to cause the signal to be printed by and during the depression of the special key, and which operation is caused by said means that is energized by the main operating device, whereby the signal printing is effected at the conclusion of the depression of the special key and previous to the operation of the said main operating device.

JASON C. LOTTERHAND.

Copies of this patent may be obtained for five cents each, by addressing the "Commissioner of Patents, Washington, D. C."